US010697567B2

(12) United States Patent
Loh et al.

(10) Patent No.: US 10,697,567 B2
(45) Date of Patent: Jun. 30, 2020

(54) FLEXIBLE DEVICE AND METHOD

(71) Applicants: Yuh Loh, Cypress, TX (US); Lorn Rendall, Houston, TX (US); Thomas McClain Scott, Cypress, TX (US); Ping Duan, Cypress, TX (US); Ermanel Isidro, Manvel, TX (US)

(72) Inventors: Yuh Loh, Cypress, TX (US); Lorn Rendall, Houston, TX (US); Thomas McClain Scott, Cypress, TX (US); Ping Duan, Cypress, TX (US); Ermanel Isidro, Manvel, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/107,490

(22) Filed: Aug. 21, 2018

(65) Prior Publication Data
US 2019/0093798 A1 Mar. 28, 2019

Related U.S. Application Data

(60) Provisional application No. 62/562,609, filed on Sep. 25, 2017.

(51) Int. Cl.
*F16L 11/12* (2006.01)
*F16L 11/127* (2006.01)
(Continued)

(52) U.S. Cl.
CPC ............ *F16L 11/121* (2013.01); *F16L 11/12* (2013.01); *F16L 11/127* (2013.01); *F16L 57/02* (2013.01);
(Continued)

(58) Field of Classification Search
CPC ...... H01R 31/06; H01R 31/02; H01R 25/003; E21B 17/023; E21B 17/20; E21B 17/206; E21B 23/00; E21B 19/22; E21B 17/028; E21B 47/01; E21B 47/12; F16L 11/121; F16L 11/127; F16L 11/12; F16L 11/081;
(Continued)

(56) References Cited

U.S. PATENT DOCUMENTS

| 3,120,987 | A | * | 2/1964 | Degnan | .............. | H01R 13/5213 |
| | | | | | | 439/588 |
| 4,494,809 | A | * | 1/1985 | Soloman | ................ | H01R 31/06 |
| | | | | | | 439/134 |

(Continued)

OTHER PUBLICATIONS

Notification of Transmittal of the International Search Report and the Written Opinion of the International Searching Authority, or the Declaration; PCT/US2018/051986; dated Jan. 28, 2019; 8 pages.

*Primary Examiner* — Gary F Paumen
(74) *Attorney, Agent, or Firm* — Cantor Colburn LLP

(57) ABSTRACT

A flexible device including a plurality of subassemblies, a connector depending from each of the subassemblies, a link connected to the connectors supplying a signal connection between the subassemblies. A resource recovery system including a spoolable conductor including a device disposed in line with the conductor, the device including a plurality of subassemblies, a connector depending from each of the subassemblies, a link connected to the connectors supplying a signal connection between the subassemblies.

9 Claims, 3 Drawing Sheets

(51) Int. Cl.
*H02G 1/06* (2006.01)
*F16L 57/02* (2006.01)
*G01F 1/00* (2006.01)
*F16L 11/08* (2006.01)
*H02G 11/00* (2006.01)
*F16L 11/18* (2006.01)

(52) U.S. Cl.
CPC .............. *G01F 1/00* (2013.01); *H02G 1/06* (2013.01); *F16L 11/081* (2013.01); *F16L 11/18* (2013.01); *H02G 11/00* (2013.01)

(58) Field of Classification Search
CPC . F16L 11/18; H02G 1/06; H02G 11/00; G01F 1/00
USPC ........ 439/654, 502, 369, 369.505, 452, 505; 166/385, 302, 60
See application file for complete search history.

(56) References Cited

U.S. PATENT DOCUMENTS

| | | | | |
|---|---|---|---|---|
| 4,572,299 A * | 2/1986 | Vanegmond | ............ | E21B 36/04 166/302 |
| 4,869,683 A * | 9/1989 | Nelson | ............... | H01R 13/5213 439/369 |
| 4,884,977 A * | 12/1989 | Sturdevan | ............... | H01T 13/04 439/125 |
| 4,917,625 A * | 4/1990 | Haile | ................... | H01R 13/639 439/358 |
| 5,171,159 A * | 12/1992 | Byrne | ................... | H01R 31/02 439/211 |
| 5,397,859 A * | 3/1995 | Robertson | ................ | H01R 4/70 174/84 R |
| 5,562,469 A * | 10/1996 | Nienhuis | ............... | E04B 2/7425 439/215 |
| 5,762,515 A * | 6/1998 | Mele | .................. | H01R 13/6392 439/367 |
| 6,030,241 A * | 2/2000 | Chiba | .................. | H01R 31/00 439/222 |
| 6,379,190 B1 * | 4/2002 | Prazoff | ................ | H01R 25/003 362/249.01 |
| 6,428,357 B1 * | 8/2002 | Dolinshek | ............ | H01R 43/18 29/856 |
| 6,669,375 B1 * | 12/2003 | Bonja | .................. | G02B 6/266 385/140 |
| 6,699,063 B2 * | 3/2004 | Lebender | ........... | H01R 13/5804 174/152 G |
| 6,743,045 B1 | 6/2004 | Hayashi et al. | | |
| 7,021,961 B1 * | 4/2006 | Soderholm | ............ | H01R 25/16 439/215 |
| 7,407,412 B2 * | 8/2008 | Khemakhem | ............ | H01R 4/70 439/282 |
| 7,445,516 B2 * | 11/2008 | Chung | ............... | H01R 13/6658 439/654 |
| 7,553,181 B1 * | 6/2009 | Van Dalinda, III | ........................ | H01R 13/6392 174/92 |
| 7,798,845 B1 * | 9/2010 | Buchanan | .......... | H01R 13/6397 439/502 |
| 8,450,610 B2 * | 5/2013 | Alvelo | ..................... | H01B 7/18 174/84 R |
| 8,710,373 B2 | 4/2014 | Lin et al. | | |
| 8,947,319 B2 * | 2/2015 | Simmons | ............... | H01Q 1/007 174/68.1 |
| 2001/0024903 A1 * | 9/2001 | Miersch | ............ | H01R 13/5845 439/452 |
| 2003/0210507 A1 * | 11/2003 | Pihet | ........................ | G01K 7/01 361/103 |
| 2004/0077189 A1 | 4/2004 | St. John et al. | | |
| 2005/0189029 A1 * | 9/2005 | Quigley | .................. | E21B 17/20 138/125 |
| 2006/0035508 A1 * | 2/2006 | Stekelenburg | ..... | H01R 13/6392 439/369 |
| 2008/0084656 A1 * | 4/2008 | Sloan | ........................ | H02G 3/00 361/601 |
| 2008/0182435 A1 | 7/2008 | Ho et al. | | |
| 2010/0055970 A1 * | 3/2010 | Elsmark | ............... | H02G 15/007 439/452 |
| 2010/0077810 A1 * | 4/2010 | De Franceschi | ....... | G01G 15/00 70/283.1 |
| 2010/0190379 A1 * | 7/2010 | Beck | .................. | H01R 13/5845 439/606 |
| 2010/0314106 A1 * | 12/2010 | Tubel | ........................ | E21B 17/20 166/250.1 |
| 2011/0067883 A1 * | 3/2011 | Falk | ........................ | E21B 43/124 166/369 |
| 2011/0232921 A1 * | 9/2011 | Hopmann | ............ | E21B 17/026 166/385 |
| 2012/0078519 A1 * | 3/2012 | Robotti | ........................ | G01C 5/04 702/5 |
| 2012/0282798 A1 * | 11/2012 | Oe | ........................ | B60L 53/18 439/369 |
| 2013/0098686 A1 * | 4/2013 | Wentworth | ............ | E21B 44/00 175/45 |
| 2014/0342593 A1 * | 11/2014 | Murphy | ........................ | H01R 13/567 439/359 |
| 2015/0380875 A1 * | 12/2015 | Coverston | ............ | A61B 5/1455 439/505 |
| 2016/0012941 A1 | 1/2016 | Ledwith | | |
| 2016/0013581 A1 * | 1/2016 | Wu | ........................ | H01R 13/5845 439/452 |
| 2016/0031685 A1 * | 2/2016 | Lawson | ........................ | B66D 1/30 414/800 |
| 2017/0252783 A1 * | 9/2017 | Thomas | ........................ | G01N 29/04 |
| 2019/0093793 A1 * | 3/2019 | Park | ........................ | B65H 73/00 |
| 2019/0093798 A1 * | 3/2019 | Loh | ........................ | B65H 73/00 |
| 2019/0300322 A1 * | 10/2019 | Loh | ........................ | B65H 49/36 |

* cited by examiner

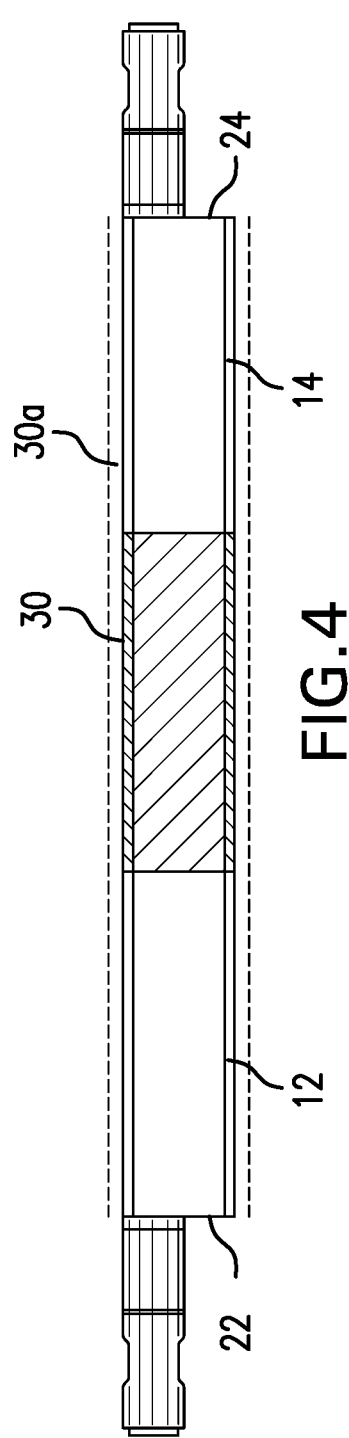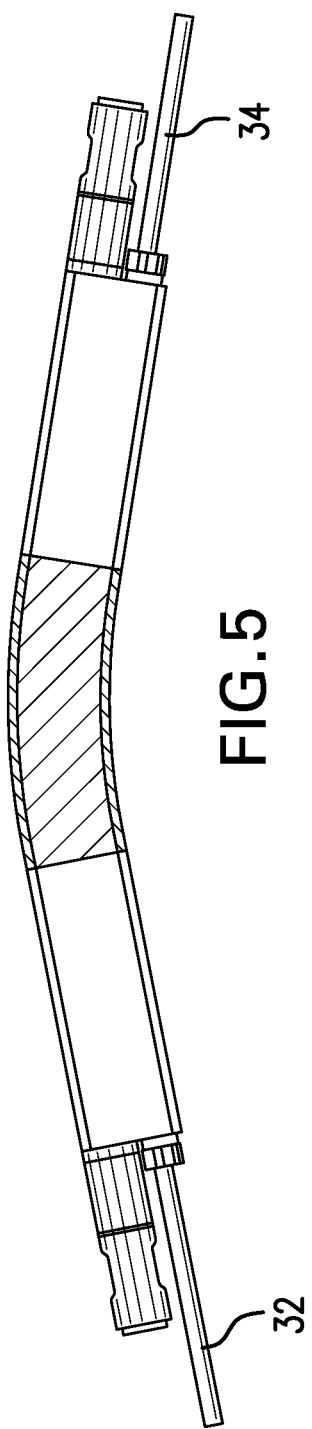

FLEXIBLE DEVICE AND METHOD

CROSS REFERENCE TO RELATED APPLICATIONS

This application claims the benefit of an earlier filing date from U.S. Provisional Application Ser. No. 62/562,609 filed Sep. 25, 2017, the entire disclosure of which is incorporated herein by reference

BACKGROUND

Where long lengths of conduit are employed for various power, communications, monitoring, etc. duties are employed they are normally spooled to manage the conduit and pay it out in an organized manner. In some cases, other devices are disposed in line on the conduit to be spooled out therewith. These include plugs for example that are spaced to be useful to whatever the end utility of the conductor has been planned. In resource recovery industries, there may also be a sheave through which the spooled conduit must be run. This presents even more difficulty as sheaves are often of an even smaller radius than spools and hence require conduits to bend even more to move therethrough.

The concept of spooling devices could be expounded upon except for the radii of the spools, and sheaves in some instances, versus the intolerance to spooling of devices that might be otherwise of interest. The art would welcome advancements that allow other devices to be spooled.

SUMMARY

A flexible device including a plurality of subassemblies, a connector depending from each of the subassemblies, a link connected to the connectors supplying a signal connection between the subassemblies.

A resource recovery system including a spoolable conductor including a device disposed in line with the conductor, the device including a plurality of subassemblies, a connector depending from each of the subassemblies, a link connected to the connectors supplying a signal connection between the subassemblies.

A method for instrumenting a target environment including disposing one or more devices as in any prior embodiment to create a conductor, running the conductor into a target environment.

BRIEF DESCRIPTION OF THE DRAWINGS

The following descriptions should not be considered limiting in any way. With reference to the accompanying drawings, like elements are numbered alike:

FIG. 4 is a schematic view of the two subassemblies of FIG. 1 with an overmolding of flexible material protecting the connections illustrated in FIGS. 2 and 3;

FIG. 5 illustrates the bending capability of FIG. 4;

DETAILED DESCRIPTION

A detailed description of one or more embodiments of the disclosed apparatus and method are presented herein by way of exemplification and not limitation with reference to the Figures.

Figure 1:
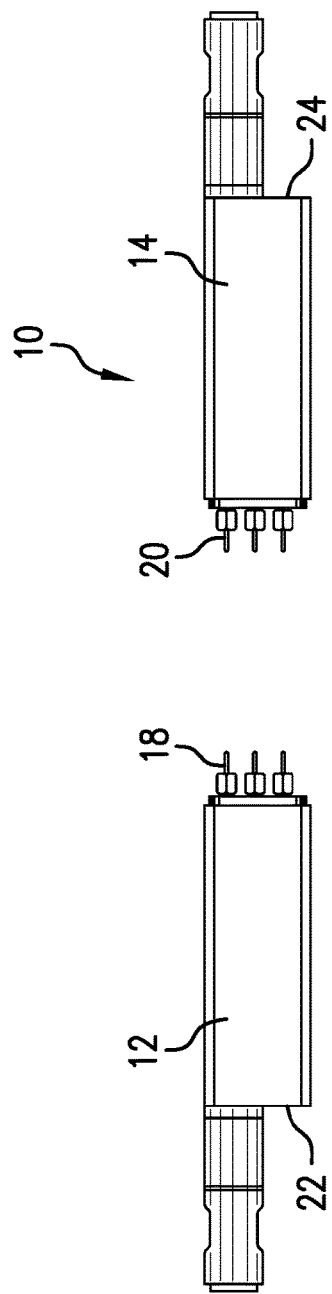
FIG. 1 is a schematic view of a device built as two subassemblies.

Referring to FIG. 1, a multipart device 10 is illustrated. Though two subassemblies 12 and 14 are shown in FIG. 1, more are also contemplated. Multipart device 10 has functions that longer devices, for example gauges, of the prior art have but due to its subassembly makeup, it avoids the rigidity and hence the problems longer gauges bear. More specifically, a longer gauge when spooled or run through a radius that causes the gauge to take a longer path than prescribed by the radius will bear bending moments through the gauge itself and could become inoperable. Further, connections to the gauge experience severe angles with the gauge. Due to the unique construction of embodiments of the invention, the devices 10 are able to bend thereby removing the risk of bending moment induced inoperability of the device and reducing connection angles to conductors at each end of the device 10. Creating subassemblies 12 and 14 requires determining which components can be packaged in each subassembly and then operationally connected to the other subassembly through links 16 (see FIG. 2) at connectors 18 and 20. The connectors 16 allow for both operability of the device 10 and for the flexibility offered by this construction. Links 16 may be electrical conductors, optic fibers, hydraulic lines combinations including at least one of the foregoing or others. Each subassembly further provides a conductor termination 22 and 24. It will be appreciated that if a particular device 10 is configured with more than two subassemblies, then the additional subassemblies that are placed between subassemblies 12 and 14 will not have conductor terminations 22 or 24 but rather will have connectors 18 and 20 on both ends of the subassembly. Upon connection of links 16, subassemblies 12 and 14 operate as a single unit for whatever function is desired. They operate identically to prior art devices such as gauges that are long and rigid but the devices 10 are flexible.

In some embodiments (see FIG. 3), it is desirable to add strength members 26 such as chains, steel rope, aramid fiber, etc. between the subassemblies 12 and 14 to ensure the device 10 is configured to resist a tensile load, explosive decompression forces encountered during pull operations, and abrasive environments encountered during installation operations, for example. The strength member 26 may replace links 16 when signal is not required or may also act as a signal carrier is desired.

Figure 2:
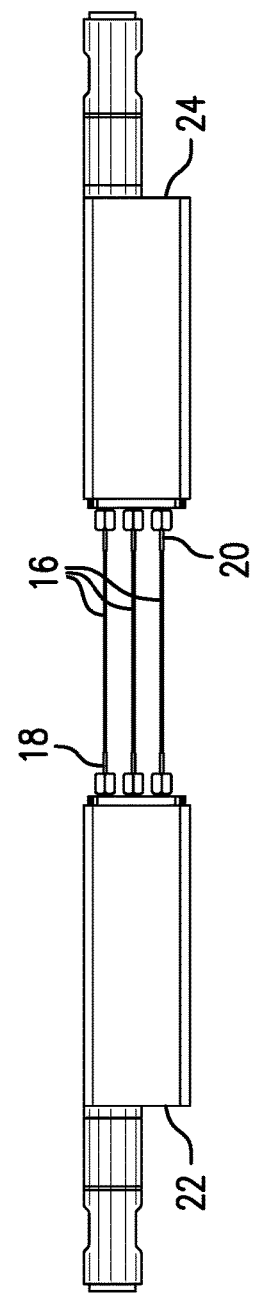
FIG. 2 illustrates the subassemblies of FIG. 1 connected to one another using a flexible signal capable media.
Figure 3:
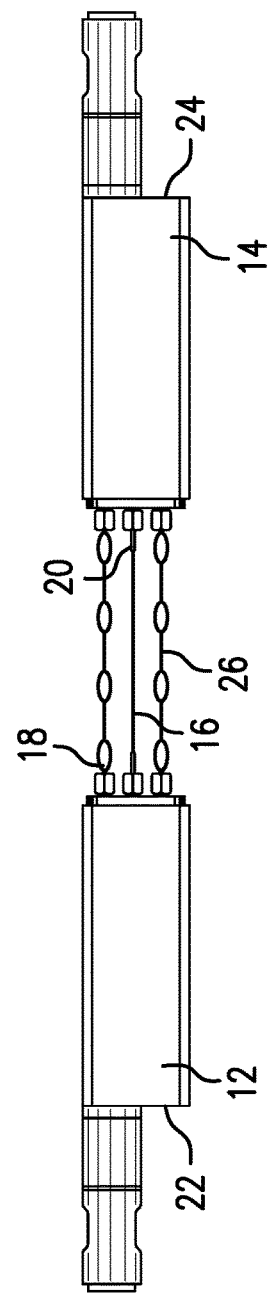
FIG. 3 illustrates a reinforced flexible connection between the subassemblies.

While it may be sufficient to employ the device 10 as illustrated in FIGS. 1-3, it is also contemplated to provide for exterior protection of the links 16 and, if applicable, strength members 26 in the form of a boot 30. This is schematically illustrated in FIGS. 4 and 5. One method for providing this protection is an overmolding operation that disposes a molded rubber boot 30 over at least adjacent ends of the subassemblies 12 and 14 or over the whole (30*a*) of the subassemblies but for the conductor terminations 22 and 24. Materials contemplated for the boot 30 include but are not limited to rubbers such as NBR, HNBR, AFLAS, etc. The boot 30 may suffice on its own or in other embodiments, strength members 26 may also be contained in the boot 30. Whether or not strength members such as wires and steel chains are used, the device 10 with subassemblies 12 and 14 is placed inside a tubular mold that may comprise a top half and bottom half. in an embodiment, at least one third of each subassembly 12 and 14 will be contained inside the mold.

The mold is heated to 150 C-250 C whereafter an un-cured rubber compound is placed inside the mold along with the subassemblies as noted. The mold is closed by placing a top half of the mold onto the top of the bottom half of the mold or other equivalent operation where portions of a mold are brought together to form a complete mold. In an iteration, the mold will be held at temperature for about 20 to about 40 minutes and allowed to cool. A completed device 10 with boot 30 will then be available.

Figure 6:
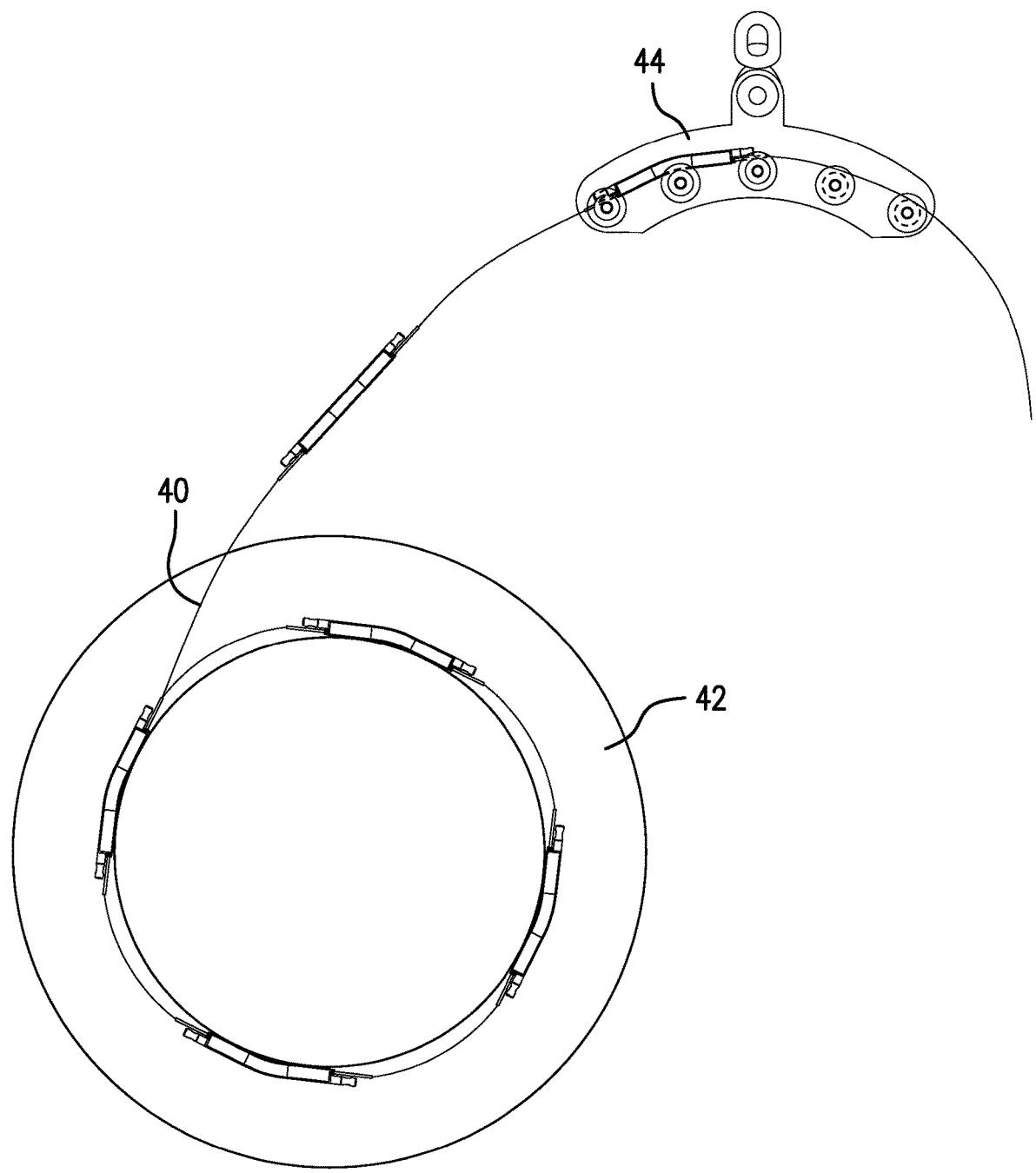
FIG. 6 is a view illustrating a conductor with a number of the subassembly devices disposed inline therein and spooled and additionally shows a sheave through which the deploying conductor will pass in some operations.

FIG. 5 illustrates the flexibility of the booted device 10. FIG. 5 also illustrates the conductor terminations 22 and 24 terminated to conductor segments 32 and 34 that together over the number of devices 10 that are used form an elongated spoolable conductor 40. The conductor 40 is illustrated on a spool 42 in FIG. 6. Further, the conductor is illustrated running through a sheave 44 in FIG. 6. Review of the condition of the device 10 on the spool relative to the device 10 located between the spool 42 and the sheave 44 and then the device 10 located in the sheave 44 reveals the flexibility of the device 10 and its effect on the conductor segments and conductor terminations in the various conditions. Because the devices 10 flex, the conductor terminations 22 and 24 as well as conductor segments 32 and 34 are always in a relatively straighter path than they would be if the devices 10 did not flex.

Set forth below are some embodiments of the foregoing disclosure:

Embodiment 1

A flexible device including a plurality of subassemblies, a connector depending from each of the subassemblies, a link connected to the connectors supplying a signal connection between the subassemblies.

Embodiment 2

The device as in any prior embodiment further comprising a strength member extending between the subassemblies.

Embodiment 3

The device as in any prior embodiment further comprising a boot extending between the subassemblies.

Embodiment 4

The as in any prior embodiment wherein the boot is overmolded rubber.

Embodiment 5

The device as in any prior embodiment wherein the boot is overmolded rubber reinforced with a strength member.

Embodiment 6

The device as in any prior embodiment wherein the boot extends to cover the subassemblies except for conductor terminations of the subassemblies.

Embodiment 7

A resource recovery system including a spoolable conductor including a device disposed in line with the conductor, the device including a plurality of subassemblies, a connector depending from each of the subassemblies, a link connected to the connectors supplying a signal connection between the subassemblies.

Embodiment 8

A method for instrumenting a target environment including disposing one or more devices as in any prior embodiment to create a conductor, running the conductor into a target environment.

Embodiment 9

The method as in any prior embodiment wherein the running includes running through intermediate equipment.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A flexible device conductor comprising:
 a plurality of functional devices, each formed by a plurality of subassemblies having at least a function to monitor a target resource recovery well with portions of a gauge in each subassembly of the plurality of subassemblies in addition to signal conduction, the plurality of devices being spaced along a length of the conductor, each subassembly including:
a connector depending from each of the subassemblies of a functional device of the plurality of functional devices;
a flexible link connected to the connectors of the functional device of the plurality of functional devices supplying a signal connection between the subassemblies of the functional device of the plurality of functional devices.

2. The device as claimed in claim 1 further comprising a strength member extending between the subassemblies of the functional device of the plurality of functional devices.

3. The device as claimed in claim 1, further comprising a boot extending between the subassemblies of the functional device of the plurality of functional devices.

4. The device as claimed in claim 3 wherein the boot is overmolded rubber.

5. The device as claimed in claim 3 wherein the boot is overmolded rubber reinforced with a strength member.

6. The device as claimed in claim 3 wherein the boot extends to cover the subassemblies except for conductor terminations of the subassemblies.

7. A method for instrumenting a target environment comprising: disposing one or more devices as claimed in claim 1 to create a conductor;
running the conductor into a target environment.

8. The method as claimed in claim 7 wherein the running includes running through intermediate equipment.

9. A spoolable conductor including;
a device formed by a plurality of subassemblies each having portions of a gauge therein, the device having at least a function to gauge a target wellbore environment in b addition to signal conduction, the device being disposed in line with the conductor;
a connector depending from each of the subassemblies of a device;
a link connected to the connectors of each subassembly of the device supplying a signal connection between the subassemblies.

* * * * *